United States Patent [19]

Morgan et al.

[11] 3,991,279
[45] Nov. 9, 1976

[54] MONOBUS INTERFACE CIRCUIT

[75] Inventors: Dennis James Morgan, Howell; Douglas Charles Smith, Locust, both of N.J.

[73] Assignee: Bell Telephone Laboratories, Incorporated, Murray Hill, N.J.

[22] Filed: May 23, 1975

[21] Appl. No.: 580,292

[52] U.S. Cl............................ 179/18 BC; 179/1 CN
[51] Int. Cl.²............................................. H04M 3/56
[58] Field of Search.............. 179/1 CN, 18 BC, 99, 179/170 R, 170 NC

[56]  References Cited
     UNITED STATES PATENTS

| | | | |
|---|---|---|---|
| 3,534,175 | 10/1970 | Schultz | 179/18 BC |
| 3,668,289 | 6/1972 | Fenton | 179/1 CN |
| 3,818,139 | 6/1974 | Snyder | 179/1 CN |
| 3,824,344 | 7/1974 | James et al. | 179/1 CN |
| 3,828,146 | 8/1974 | Lewis | 179/18 BC |
| 3,891,801 | 6/1975 | Wang | 179/1 CN |
| 3,909,559 | 9/1975 | Taylor | 179/1 CN |

Primary Examiner—Kathleen H. Claffy
Assistant Examiner—Randall P. Myers
Attorney, Agent, or Firm—David H. Tannenbaum

[57] ABSTRACT

In order to reduce the signal loss in a telephone line switching and conferencing system there is interposed between each line and the switching matrix a monobus port circuit arranged to convert a transmitted telephone signal into an equivalent current source. The currents from several monobus circuits are added in a bus resistor before distribution back to the individual monobus circuit as a voltage where the original signal is subtracted from the bus signal. The resultant signal is transmitted to the telephone receiver. When the switching matrix crosspoint resistance is negligible, the component of the bus voltage measured at the current source output which results from current generated from each line is equal and opposite in magnitude to the voltage generated in the line. In any given line these voltages cancel each other, thereby eliminating the feedback signal.

15 Claims, 3 Drawing Figures

MONOBUS INTERFACE CIRCUIT

FIELD OF THE INVENTION

This invention relates to telephone conferencing and transmission systems and, more particularly, to a port circuit useful for reducing the signal loss on switching and conference connections.

BACKGROUND OF THE INVENTION

When it is desired to conference a number of telephone lines it is customary to use four-wire operation where the transmit and receive communications signals are on individual wire pairs. The wire pairs from each line are then selectively interconnected through a common amplifier by a switching matrix with the crosspoints of such matrix having the capability of switching all four wires of each line. Such a switching matrix when constructed electromechanically is inherently bulky and when electronics is used to reduce the size the need for four crosspoints per line circuitry becomes prohibitively expensive.

Two-wire conferencing is possible with series and parallel negative impedance, however the negative impedance must be changed for different conference sizes and configurations. Control of the negative impedance can be awkward.

Another problem exists when three or more telephones are connected together in conference fashion with no special conferencing circuitry. In such a situation a loss of signal strength is experienced compared with the signal strength in a typical two telephone connection. As each additional telephone station is added to the conference the signal strength is reduced proportionately. When the crosspoints of the switching matrix have zero resistance, the loss in signal strength is caused by the additional impedance load of each added telephone station.

Thus, a need exists in the art for a circuit which, operating in conjunction with other such circuits, converts a transmission path, in an economical manner, from multiwire operation to bidirectional single-wire operation, without reducing the signal strength as additional circuits are added. Such a circuit would then be useful for, among other things, conferencing large numbers of communication lines without requiring extensive switching network crosspoint matrices.

SUMMARY OF THE INVENTION

Such a need has been met in an illustrative embodiment of our invention in which a port circuit is interposed between a transmission line and a switching matrix.

The interface circuit is a current source arranged to provide the current equivalent of the voltage signal available from the transmission source. One bus resistor is supplied by the switching matrix and is shared in common by the monobus circuits serving the other connected transmission lines. In this manner the current signal generated by the port circuit current source is converted to a voltage signal by flowing through the common bus resistor and supplied via the switching matrix to each other connected port circuit.

When the switching matrix crosspoint resistance is negligible, the component of the bus voltage measured at the current source output which results from current generated from each line is equal and opposite in magnitude to the voltage generated in the line. In any given line these voltages cancel each other, thereby eliminating the feedback signal.

Since for unbalanced operation the output from each port can be a single wire, the switching matrix is reduced to one device per crosspoint without inherently limiting the number of lines which can be interconnected concurrently.

Accordingly, it is a feature of our invention that a conference circuit is provided having a bidirectional output separated into voltage and current signals, both supplied over the same wire.

It is a further feature of our invention that there is provided a balanced high impedance bridge circuit associated with a telephone line arranged to provide transmission to and from the telephone line over a single line while at the same time operating to remove feedback signals from the line.

BRIEF DESCRIPTION OF THE DRAWING

These and other objects and features will be more fully understood from a review of the drawing, in which.

DETAILED DESCRIPTION

In the following discussion the letter $i$ is used to designate the number of any particular port circuit. Thus, amplifier A$i$-1 associated with port circuit PC1 is the notation for amplifier A1-1. Similarly, the Q$i$-1 transistor associated with port circuit PC2 is shown in port circuit PC2 as transistor Q2-1.

Figure 1:
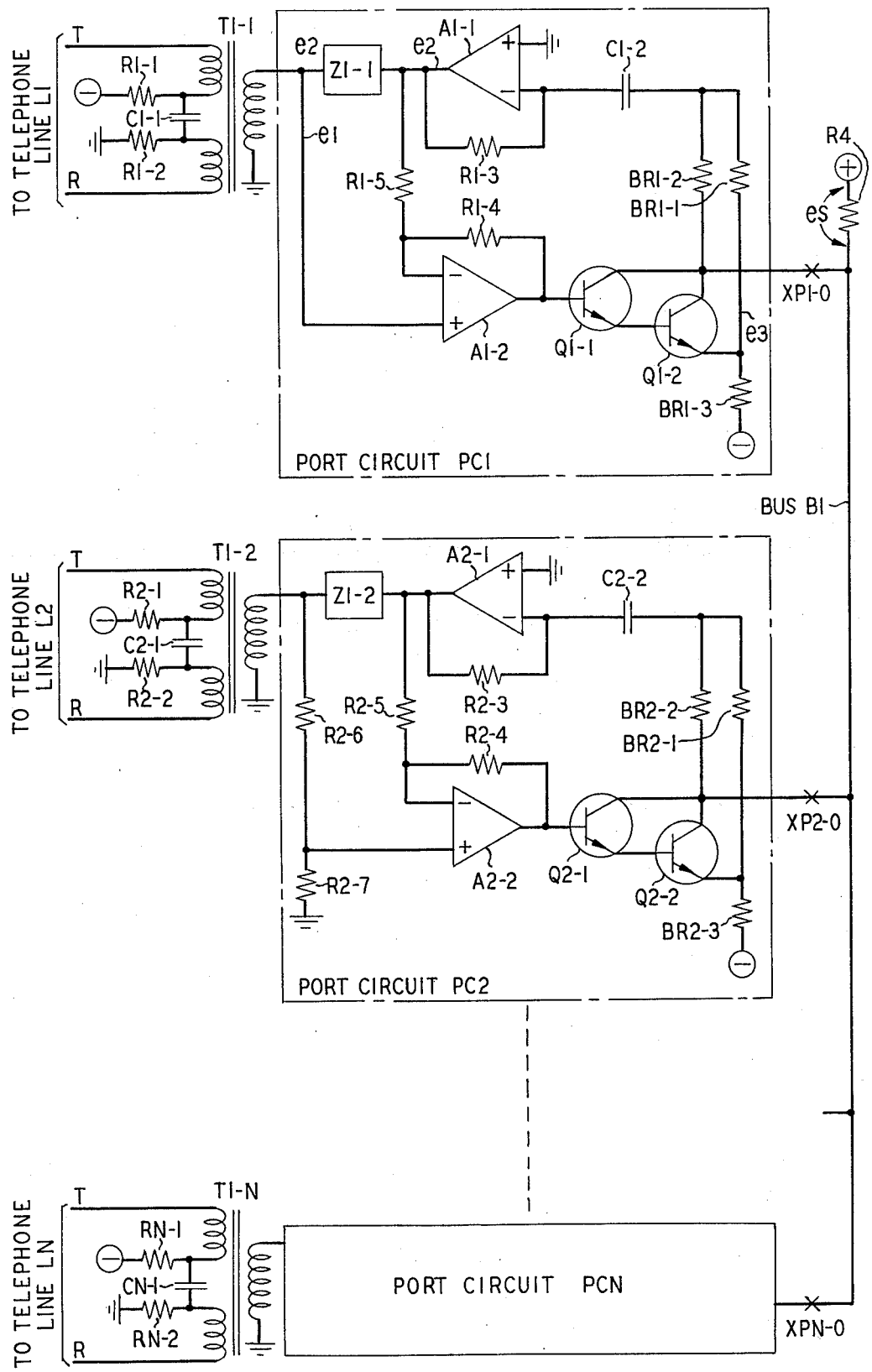
FIG. 1 shows one embodiment of our port circuit for use in a single-wire bus conferencing arrangement.

As shown in FIG. 1, each port circuit, in response to signal transmission voltage over the associated telephone line, such as telephone line L1, transmits a signal to bus B1 as a signal current from the current source comprised of Q$i$-1 and Q$i$-2. The resultant signal voltage, shown as voltage es on bus B1 is the sum of all signal currents multiplied by resistor R4. In each port circuit, amplifier A$i$-1 subtracts the port circuit's own contribution to the bus signal and applies the amplified result to the telephone line through Z$i$-1 and T$i$-1. Operational amplifier A$i$-2 along with associated components Z$i$-1, R$i$-5, and R$i$-3 constitute an electronic hybrid of the type disclosed in U.S. Pat. No. 3,824,344 issued to Dennis B. James and James R. McEowen on July 16, 1974. This hybrid separates the directions of transmission from the telephone set into two separate paths; i.e., the transmit path from the output of amplifier A$i$-2 and the receive path from the output of amplifier A$i$-1.

The purpose of the monobus circuit is to recombine the two transmission paths onto a single wire while at the same time maintaining four-wire transmission, i.e., separate and distinguishable channels for received and transmitted signals. This is accomplished by separating the directions of transmission as voltage signals or current signals on the same wire.

In order to establish a conference, several ports are connected to a bus which is terminated by resistor R4. Each port presents a high impedance to the bus and consists of a current source and a voltage amplifier. A signal voltage at the base of transistor Q$i$-1 appears at the emitter of transistor Q$i$-2 as voltage e3. This results in a signal current applied to bus B1 having a value of e3/BR$i$-3.

If resistor R4 is made equal to resistor BR$i$-3 a resultant signal, es, equal to -e3 appears on the bus across resistor R4. The total current through resistor R4 at any time is the sum of the contributions from all ports. Thus, es is equal to the negative of the sum of the e3's from each port. In this manner each port transmits a signal to the bus as a signal current.

Transmission from the Bus to a Port

Operational amplifier A$i$-1 and associated components, R$i$-3, C$i$-2, BR$i$-1, and BR$i$-2, form the voltage amplifier for the receive path. This amplifier senses bus signal voltage and delivers it to the port hybrid. Resistor BR$i$-1 serves to cancel out the port's own contribution to signal es, so that signal e2 comprises those signals contributed by other ports only. Resistor BR$i$-2 is connected from the bus to the virtual ground at the input node of amplifier Al-1 and thus the impedance seen looking into the port from bus B1 is BR$i$-2 in parallel with are composite collector impedance of transistors Q$i$-1 and Q$i$-2. This impedance is approximately equal to the value of resistor BR$i$-1. If resistor BR$i$-2 is much larger than resistor R4, the signal levels are not noticeably affected as new ports are added to a conference. Thus, using the monobus technique just described, many ports can be added to a conference with low loss.

DC Voltage Protection

Capacitor C$i$-2 breaks the dc feedback loop in the port circuit insuring low frequency stability and a low offset voltage in amplifier A$i$-1. In addition, if a pure resistance is used for resistor R4, the dc voltage on bus B1 varies with the number of ports since each port draws dc as well as signal current through resistor R4. Capacitor C$i$-2 also prevents the dc bus voltage from saturating amplifier A$i$-1.

Stability for Conferencing

The stability of large conferences can be improved by adjusting the ratio of resistor BR1-2 to resistor R4. By lowering this ratio the bus is loaded down in a controlled manner as new ports are added to a conference, by the paralleling of the BR$i$-2 resistors with resistor R4, thereby giving a lower effective value of resistor R4. This lowers the ac gain and injects negative feedback in increments as more ports are added to the conference. For instance, if the ratio of resistor BR1-1 to resistor R4 is 25, then the gain is reduced approximately 0.4dB for each new port added.

Balanced Port Circuit

Figure 2:
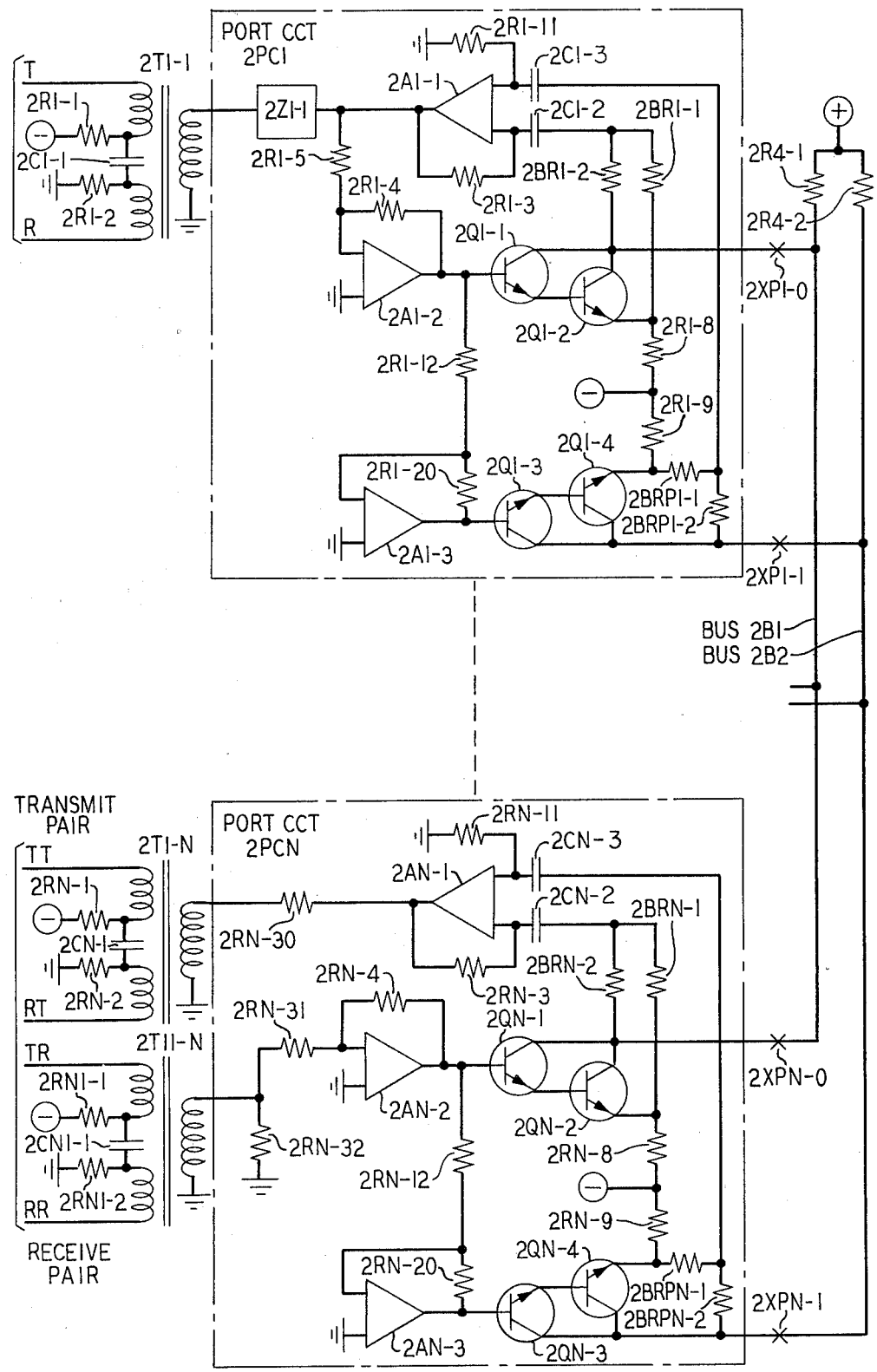
FIG. 2 shows an embodiment of our port circuit for use in situations where crosstalk is to be reduced.

FIG. 2 illustrates a balanced bus version of the port circuit for use in applications where crosstalk or induced noise is a problem. Amplifier 2A$i$-3, resistor 2R$i$-12, and resistor 2R1-20 have been added to produce a signal out of phase with the signal from amplifier 2A$i$-2. This out-of-phase signal is applied to transistors 2Q$i$-3 and 2Q$i$-4 and resistor 2R1-9, which act as the signal current source for the second path of the balanced bus pair. This signal is applied to a second bus 2B2 via crosspoint 2XP$i$-1. Resistors 2BRP$i$-1, 2BRP$i$-2 and 2R$i$-11 and capacitor 2C$i$-3 are added to amplifier 2A$i$-1 to convert it to a balanced input amplifier. Under such an arrangement, the circuit is sensitive only to the differential signal between bus 2B1 and bus 2B2. Common mode signals which are in phase with each other, such as induced noise, are rejected by the balanced amplifier A$i$-1, thereby providing a circuit which gives high crosstalk and noise protection.

Port circuit 2PCN, shown in FIG. 2, is arranged for four-wire operation where transmission from the telephone station arrives on the receive pair leads TR and RR and transmission to the telephone station is returned over the TT and RT pair of leads. Since the transmission directions are separated there is no need to connect the output of amplifier 2AN-1 with the input to amplifier 2AN-2 as shown in port circuit 2PC1. Resistors 2RN-31 and 2RN-32 are used to terminate the input to the port circuit from transformer 2T11-N, while resistor 2RN-30 terminates the output to transformer 2I1-N. In all other respects, port circuit 2PCN operates in the same manner as does port circuit 2PC1. It should be understood that, with respect to the port circuits shown in FIG. 1, any or all could be of the four-wire type by separating the crossconnection between amplifier A$i$-1 and amplifier A$i$-2 and adding the resistors as shown in port circuit 2PCN.

Port Circuit with No DC Bias

Figure 3:
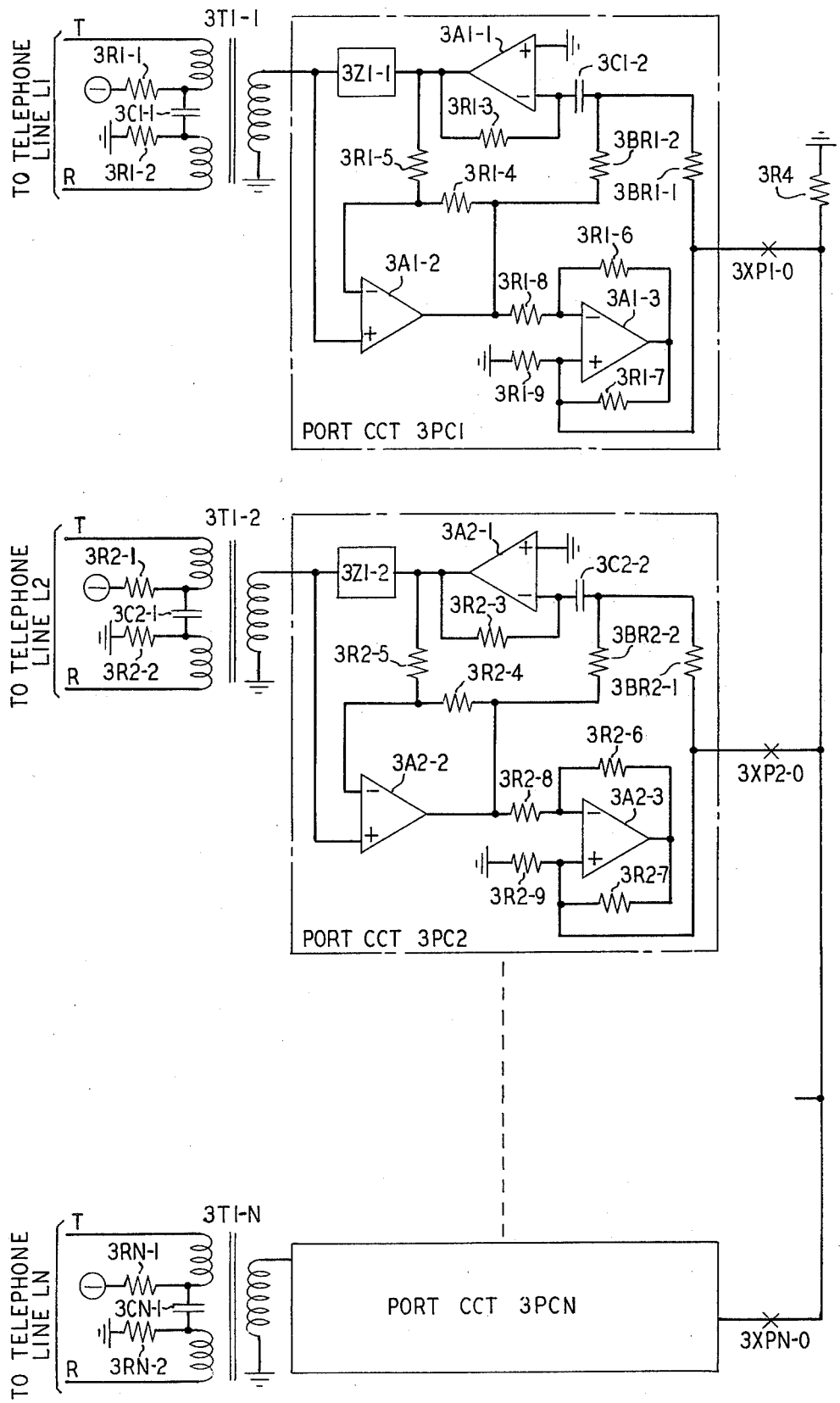
FIG. 3 shows an embodiment of our port circuit for use when crosspoint dc bias is not desirable.

The port circuits of FIG. 3 operate in the same manner as described for FIGS. 1 and 2 except that the transistor current source is replaced by an operational amplifier current source composed of operational amplifier 3A$i$-3 and associated resistors 3R$i$-6, 3R$i$-7, 3R$i$-8, and 3R$i$-9. This current source can be used where only the signal current is desired and a dc bias current is unwanted. Several types of crosspoints, for example, CMOS, operate well with this port circuit.

Conclusion

Although the operation of the port circuit has been discussed in conjunction with a multiport conference system, it is readily apparent that the port circuit will find other uses in situations where it is important to separate the transmission direction on a single path. For example, in switching networks which are arranged for two-wire operation, it is sometimes necessary to interconnect two four-wire ports such as trunks with a single path. With present systems, such an interconnection is accomplished by a hybrid circuit. The port circuit of this invention can be used to replace such a hybrid. In such a situation, the common summing impedance could be associated with one of the port circuits or with the switching machine.

What is claimed is:

1. An interface circuit for use in a switching system where any number of telephone communication lines can be connected together for transmission purposes, one said interface circuit being interposed between each telephone line and a first common bus, said first common bus including a summing impedance shared in common by any interface circuit connected to said first common bus, each said interface circuit including first output current signal means for communicating to said common summing impedance over a signal path output current signals respresentative of input voltage signals from said associated telephone line; said communicated output current signals thereby being convertible into bus voltage signals by said first bus summing impedance, means for applying any converted bus voltage signals over said signal path to said telephone line associated therewith, and means for subtracting from said applied converted bus voltage signals any portion of said converted voltage signals which are representative of input voltage signals received over said associated telephone line.

2. The invention set forth in claim 1 wherein said first output current signal means forms part of a balanced high impedance bridge.

3. The invention set forth in claim 1 wherein said first output current signal means includes at least one high impedance current source connectable to said bus.

4. The invention set forth in claim 3 wherein said high impedance current source includes at least one transistor.

5. The invention set forth in claim 3 wherein said high impedance current source includes at least one operational amplifier.

6. The invention set forth in claim 1 wherein said telephone line applying means includes an operational amplifier having an input connected to said common bus.

7. The invention set forth in claim 6 further comprising means for preventing dc bias from affecting said operational amplifier.

8. The invention set forth in claim 1 wherein said interface circuit is interposed between each said telephone line and a second common bus, said second common bus including a second summing impedance shared in common by any interface circuit connected to said second common bus, each said interface circuit further including, second output current signal means for communicating to said second summing impedance output current signals out of phase with but identical to said output current signals from said first output current signal means; said communicated out-of-phase output current signals thereby being convertible into second bus voltage signals by said second summing impedance, means for comparing any converted first bus voltage signals with said converted second bus voltage signals, and means for inhibiting said converted bus voltage signal applying means when said compared signals are in phase with each other.

9. A port circuit for interconnecting two or more multiwire telephone lines over a common bus, one said port circuit interposed between each said line and said common bus, said common bus including means for converting current signals applied thereto into common bus voltage signals, each said port circuit including means including a multielement resistive circuit arranged to produce output current signals representative of voltage signals present on said associated telephone line, means including at least a first element of said multielement circuit for applying any said produced output current signals to said common bus over a signal path, means including at least a second element of said multielement circuit for applying over said signal path any said common bus voltage signals to said associated telephone line, and means including at least a third element of said multielement circuit for subtracting from said common bus voltage signals any portion of said common bus voltage signals converted from output current signals which were produced from said port circuit.

10. The invention set forth in claim 9 wherein said output current signal means forms part of a balanced high impedance bridge.

11. The invention set forth in claim 10 wherein said output current signal means includes at least one high impedance current source.

12. The invention set forth in claim 11 wherein said high impedance current source includes at least one transistor, the collector thereof connectable to said bus.

13. The invention set forth in claim 11 wherein said high impedance current source includes at least one operational amplifier.

14. In combination,
a first bus,
means associated with said first bus for converting current signals supplied thereto into bus voltage signals,
a plurality of telephone lines,
means for individually connecting said telephone lines to said first bus,
means associated with each said telephone line for converting voltage signals supplied on said associated telephone into current signals,
means operable for providing any said converted current signals to said first bus,
means, including said last mentioned means, associated with each said telephone line for providing said bus voltage signals to said associated telephone line, and
means associated with each said telephone line for subtracting from any said provided bus voltage signals any portion of said provided bus voltage signals which were converted from voltage signals supplied on said associated telephone line.

15. The invention set forth in claim 14 wherein said converted current signal providing means is selectably controllable.

* * * * *

Dedication 3,991,279.—*Dennis James Morgan*, Howell, and *Douglas Charles Smith*, Locust, N.J. MONOBUS INTERFACE CIRCUIT. Patent dated Nov. 9, 1976. Dedication filed June 2, 1978, by the assignee, *Bell Telephone Laboratories, Incorporated.*

Hereby dedicates to the Public the entire term of said patent.

[*Official Gazette August 1, 1978.*]